United States Patent [19]

Carlson

[11] Patent Number: 4,656,411
[45] Date of Patent: Apr. 7, 1987

[54] DC CURRENT CONTROLLER FOR HYDROSET BATTERY ELECTRODE ELECTROFORMATION

[76] Inventor: Daniel P. Carlson, 10034 Plum Rd., Erie, Pa. 16510

[21] Appl. No.: 671,113

[22] Filed: Nov. 13, 1984

[51] Int. Cl.$^4$ .................................................. H01M 10/44
[52] U.S. Cl. ........................................ 320/16; 320/17; 320/19; 320/21; 320/40; 204/2.1
[58] Field of Search ................................... 320/15–19, 320/21, 39, 40; 363/41, 121, 124; 204/2.1, 6

[56] References Cited

U.S. PATENT DOCUMENTS

| | | | |
|---|---|---|---|
| 3,348,117 | 10/1967 | Howden | 320/18 |
| 3,553,561 | 1/1971 | Lesher | 320/39 X |
| 3,864,617 | 2/1975 | Smith et al. | 320/39 X |
| 3,912,108 | 10/1975 | Clayton et al. | 320/39 |
| 3,929,505 | 12/1975 | Burkett et al. | 204/2.1 |
| 4,016,473 | 4/1977 | Newman | 320/21 X |
| 4,290,007 | 9/1981 | Fisher et al. | 320/17 X |
| 4,313,078 | 1/1982 | Bilsky et al. | 320/15 |
| 4,382,222 | 3/1983 | Kurz et al. | 320/61 |
| 4,431,871 | 2/1984 | Gupta | 307/570 X |
| 4,443,752 | 4/1984 | Newman | 320/40 X |
| 4,467,266 | 8/1984 | Ritchie | 320/18 X |
| 4,472,672 | 9/1984 | Pacholok | 320/21 |
| 4,546,302 | 10/1985 | Smith | 320/40 X |
| 4,567,421 | 1/1986 | Dattilo | 320/40 X |

Primary Examiner—W. B. Perkey
Attorney, Agent, or Firm—Charles L. Lovercheck; Wayne L. Lovercheck; Dale R. Lovercheck

[57] ABSTRACT

A closed loop regulating system suitable for battery plate formation is provided. The circuit incorporates MOS FET and provides compensation for resistance changes that occur in MOS FET devices due to temperature changes. The regulating system also has means to precisely compensate for substantial impedance changes that occur over long time periods of an electroforming cycle for loads of various sizes.

37 Claims, 16 Drawing Figures

DC CURRENT CONTROLLER FOR HYDROSET BATTERY ELECTRODE ELECTROFORMATION

BACKGROUND OF THE INVENTION

Lead acid battery plate or electrode formation and battery charging can be considered a form of plating. The plates or electrodes of lead acid batteries are formulated as a paste and pressed into a grid forming the plate. The grid composition is mainly hard lead and the paste is proprietory to the battery manufacture. The result of the plate or electrode manufacturing process is positive and negative type plates. The plates are then submerged in a weak solution of sulfuric acid for electroformation. The container can be either a large tank or the actual battery box, using the actual battery box which is the subject or intent of this invention the battery appears to be complete in appearance. These batteries can be called green because when the electrolite (sulfuric acid and water $H_2SO_4 + H_2O$) is added there will be no terminal voltage.

When the weak solution of sulfuric acid is added to the green batteries and a D.C. current is passed through the battery from the positive to the negative battery terminal electroformation of the plates occur. Electroformation results in the positive type plate forming into lead dioxide ($PBO_2$) and the negative type plate forming in sponge lead (PB). The specific gravity of the sulfuric acid solution increases to about 1.275, depending, of course, on battery type and battery manufacture, at the end of the electroformation cycle. The increase in specific gravity of the acid solution indicates a transfer of a sulfur oxide ion contained within the plates combining with hydrogen to form $H_2SO_4$.

The intent of the battery manufacture is to electroform the greatest volume of material per plate or electrode as possible to insure the specified life time performance of the battery to the consumer. The above stated description of battery manufacturing is simplified in order to formulate the objective of this invention. The specifics or electrode analysis after electroformation are propietory to the battery manufacture. The intent or object of this invention is to provide a machine, device or system that will surpass the performance of the present or conventional technology that will electroform green (hydro-set) batteries in a manufacturing mode to produce a battery that meets the electrical parameters required for the specific battery group size. The major conventionaly technology presently used in manufacturing batteries is a solid state control system employing silicon controlled rectifiers (SCR) as the power switching devices that commutate on and off at the standard line frequency of 60 hertz. Applicant has discovered that by controlling the power factor, selecting an operating frequency that reduces the size and power loss of the magnetic element, protecting the element from over current surges the overall efficiency of the device is improved.

REFERENCE TO PRIOR ART

Applicant is aware of the following patents, none of which anticipate the present invention: U.S. Pat. No. 4,119,904 to Haglund, U.S. Pat. No. 4,382,222 to Kurz, U.S. Pat. No. 4,409,538 to Tabata, U.S. Pat. No. 4,431,871 to Gupta, and U.S. Pat. No. 4,443,752 to Newman.

GENERAL STATEMENT OF THE INVENTION

A pulse width modulator (PWM) DC to DC current controller for use in battery electrode electroformation is disclosed. It may be powered by a three phase AC to DC converter. A plurality of PWM controllers are connected to the common DC source or paralleled and will form the same number of battery circuits as PWM. (The number of unformed batteries per circuit depends on the source voltage) The circuit uses an inline load approach with a magnetic current limiting means. The inline approach reduces the high voltage that the switching devices would experience using a transformer to couple the load to the series battery group, reduces the higher source voltage by at least 50 percent that is required by a transformer coupled to the battery load for the same number of series connected batteries to be formed. It eliminates the need for a special rectifying means on the output of the secondary of the transformer that is connected to the load. In addition the turn on and turn off times of the switching devices can be controlled individually by low cost circuit elements that are simple to modify. These turn on and turn off times greatly affect the battery electrode formation process performance. The switching devices are metal oxide of silicon field effect transistors (MOS FET) which have several major advantages over bipolar transistor and the like. They increase reliability in this application. The protection circuits protect the PWM as a single system and also protect the operators from the hazard of an electrical shock. The PWM has specialized closed loop regulating circuitry to compensate for the inherent resistance changes due to operating temperature changes using MOS FET switching devices. Regulating circuitry in addition is essential to compensate for the drastic impedance changes that occur over an electroformation cycles. The load current must remain within certain tolerance limits to achieve the ampere-hour input required to form a particular battery group size. The drastic impedance changes are not experienced when simple batteries are charging. An unformed battery becomes a usable battery when electrically activated.

OBJECTS OF THE INVENTION

An object of the present invention is to achieve high efficiency by minimizing the losses in the power circuit for battery plate formation.

Another object of the invention is to provide a circuit which will maintain a high power factor that is as close to 100 percent over the entire current control range (conventional (SCR) systems power factor decreases as the current is reduced toward zero because of the phase back of the SCR's to maintain a desired load current in a battery plate formation circuit.

Another object of the invention is to select an operating frequency battery formation circuit that reduces the size and power loss of the magnetic element in the power circuit but will still limit the di/dt or current rate of rise for the "on" time period of operation to protect the solid state switching devices from overcurrent surges in a battery plate formation circuit. A battery goes through a drastic impedance change from start to completion of a formation cycle that influences the pulse current wave shape. The electrical parameters of the magnetic element will maintain a pulse wave shape that is advantageous to overall formation efficiency.

Another object of the invention is to structure the power circuit so that the voltage during the off period or non-conducting time of the switching devices does not exceed 60 percent of their breakdown voltage of 500 V.D.C. with a supply voltage B+ =250 V.D.C. in a battery plate formation circuit.

Another object of the invention is to select a switching device that is able to be turned on and off without complicated commutating circuitry and is a great deal less subject to the second breakdown problems that bipolar transistors experience at the operating voltage of 250 V.D.C. Therefore there are four major advantages in using power Metal-Oxide Semiconductor Field Effect Transistors (MOS FET):

A. They are extremely fast turning on and off which reduces switching loss and device heating.

B. They do not experience the second breakdown phenomenon that is inherent to the bipolar transistor.

C. The gate drive circuitry is not power absorbing and simple because the FET is a voltage controlled device.

D. To increase current handling, devices are paralleled and will share current because of the inherent positive temperature coefficient. The FET do not require the proper sized external source resistors as do the bipolar transistors in their emitters to force share current. The FET have a positive temperature coefficient and when they are paralleled and conducting current their resistance increases forcing current sharing among the parallel group. All four advantages are important to the operation of the circuit but (B) makes the circuit operate reliably.

Another object of the invention is to structure the circuitry that will not only compensate for the internal increase in resistance change as the FET's operating temperature increases but also compensate for the large impedance changes the forming batteries go through over the electroformation cycle. The electroformation cycle is a time-current cycle that can be a constant current cycle for the correct amount of hours to achieve the proper amount of amp-hours for the particular battery group size being formed. The cycle could be programmed to have various current value steps over predetermined time intervals. Either formation approach requires the circuitry to maintain a constant current and to be stable.

Another object of the invention is to provide protective controls for both personnel protection and system protection. These controls are:

A. Thermal protection for each power switching device, that will cause system shutdown.

B. The open circuit detector (OCD) will shut the system down if the power circuit opens. This provides personnel protection if a power cable comes loose from the battery group being formed or if one of the batteries in the group becomes faulty (open circuits inside of a battery can cause hydrogen gas explosions if an arc is not suppressed).

C. A reverse battery protection (RBP) circuit is employed so that if a partially formed group of batteries is moved and reconnected improperly the PWM system cannot be energized until the reverse voltage is less than 20 volts.

D. The instantaneous overcurrent circuit (IOC) will shut the unit down when a fault is detected, and the circuit is configured to protect each power MOS FET transistor. The individual MOS FET IOC protection enables total system current to increase by adding more FETs in parallel, but under a short circuit condition one FET may conduct or hog the current, therefore, individual proteciton is necessary. The IOC time response is therefore designed in coordination to the di/dt or rate of rise of current limited by the magnetic circuit inductance (choke) and will shut the system down in less than one pulse period.

Another object of the invention is to allow for an electronic means of adjusting the current waveshape without changing the choke value. This will effect both the load current rise and fall times independently and allow for optimizing the PWM for best electroformation performance for the batteries.

Another object of the invention is when the PWM is faulted or if the control power is shut off, there will be an automatic reference reset and also a soft start so that if PWM is started the circuitry will provide load current at a controlled rate of increase even if the current reference potentiometer is turned up abruptly or already turned on. This will allow the closed loop current control circuity to gain control of the load current and reduce unnecessary IOC faults.

Another object of the invention is to reduce any possibilities of parasitic oscillations occurring in a parallel group of power MOS FET switching transistors.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIGS. 7A–7D, is a wave shape to the duty cycle generator.

FIG. 7A is another sequence of a saw tooth wave.

FIG. 7B shows the second saw tooth wave generator.

FIG. 7C is a positive pulse output of the duty cycle generator.

FIG. 7D is a negative pulse output of the duty cycle generator.

FIGS. 8A–8D, shows a flattened saw tooth wave.

FIG. 8A is a wave shape of a flattened saw tooth wave.

FIG. 8B shows a positive pulse.

FIG. 8C shows a flattened saw tooth wave.
FIG. 8D shows a pulse.

DETAILED DESCRIPTION OF DRAWINGS

Figure 1:
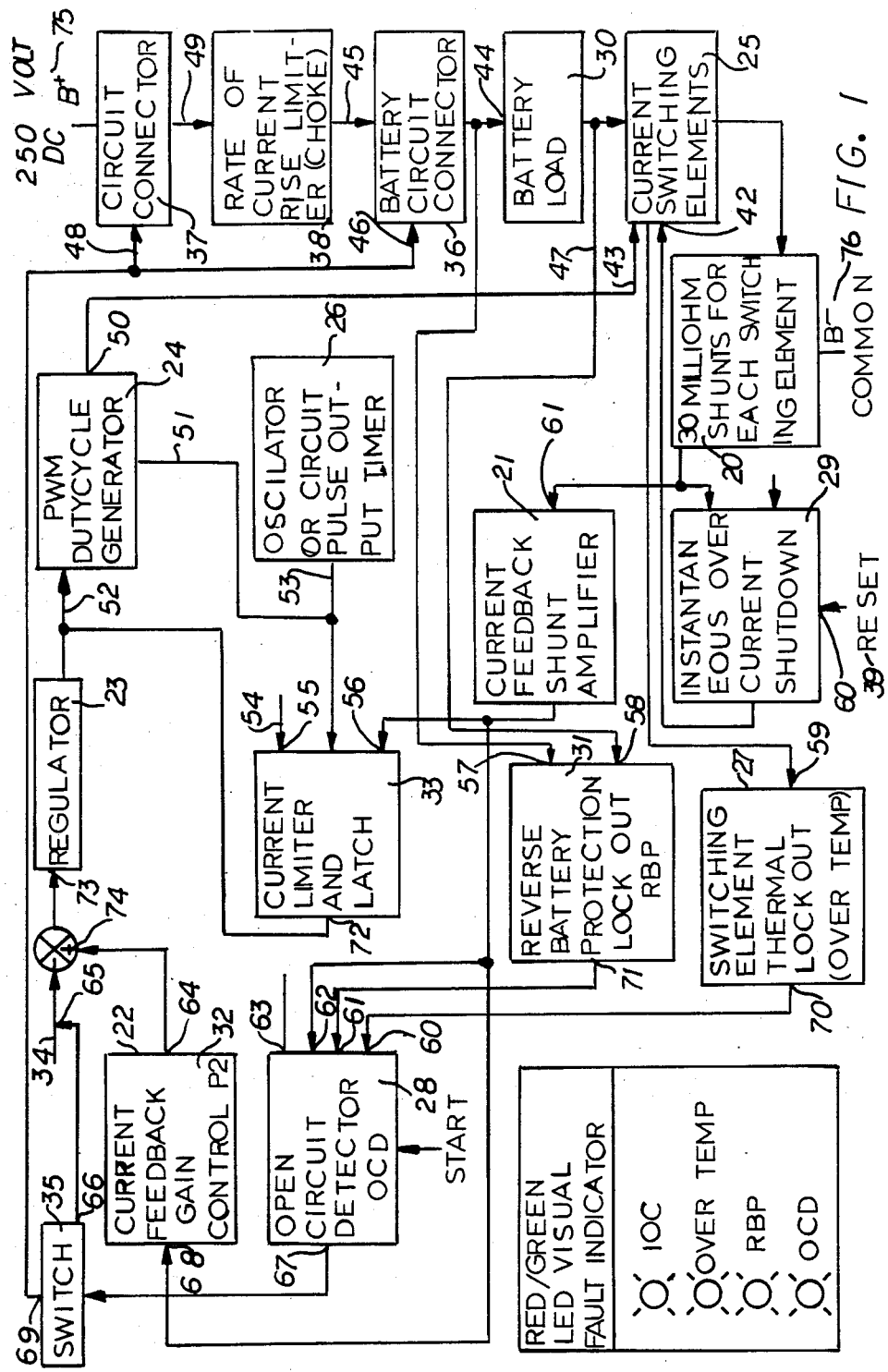
FIG. 1 shows a block diagram controller for battery plate formation 016C.
Figure 2:
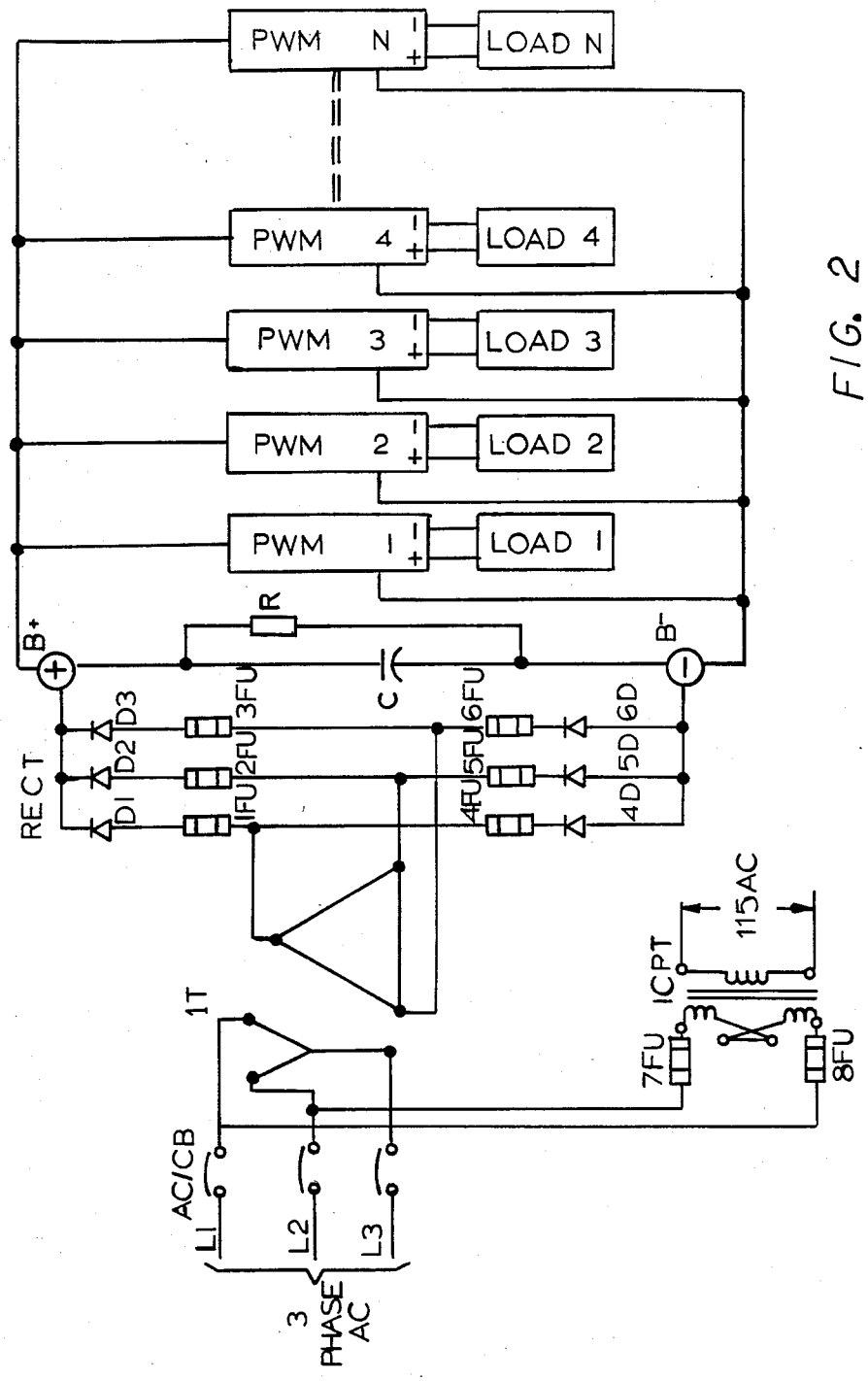
FIG. 2 shows power distribution and load connection.
Figure 3:
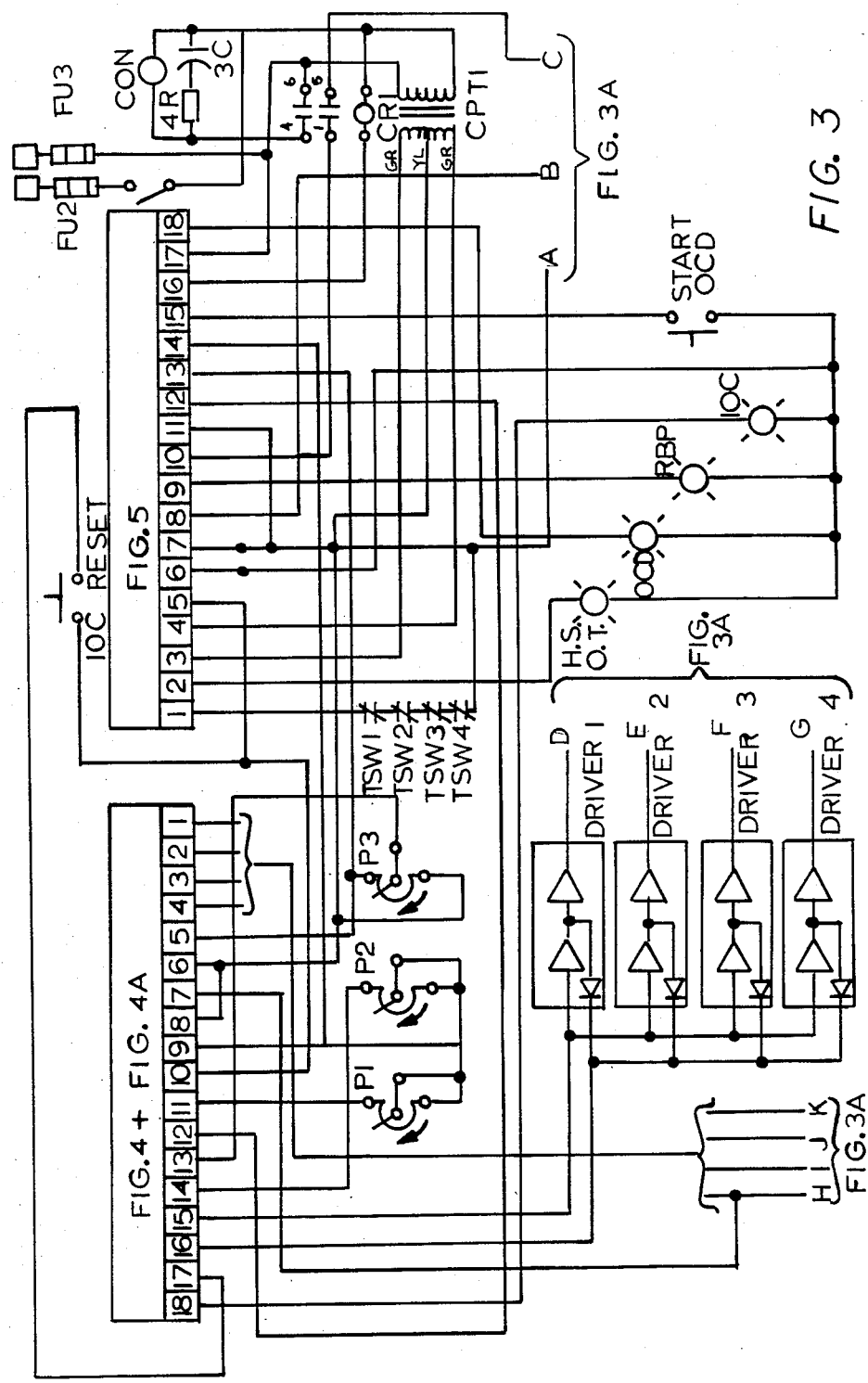
FIG. 3 is a part of a wiring diagram of the pulse width modulator battery plate formation system.
Figures 3, 3A:
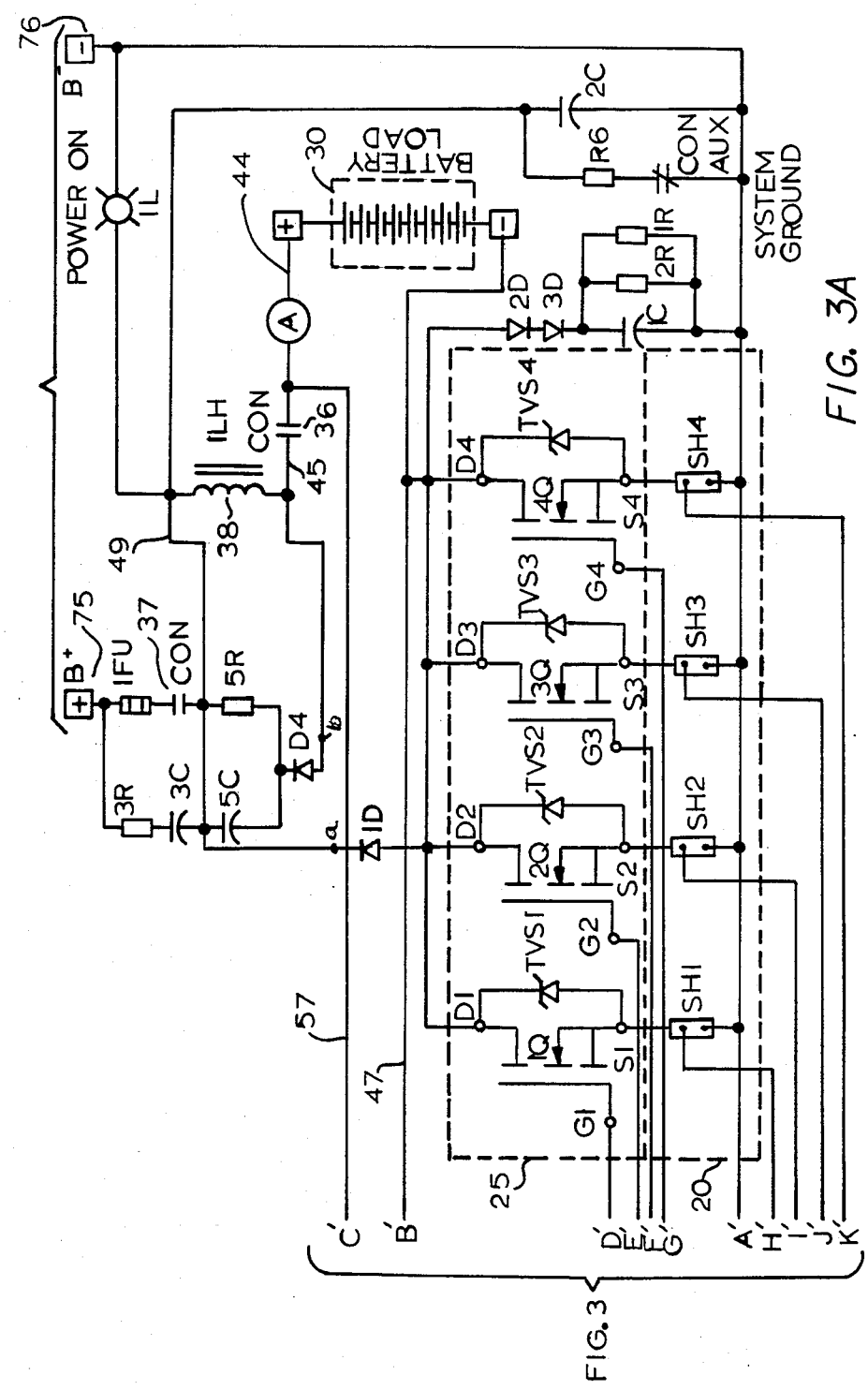
FIG. 3A is a schematic diagram of the current switching element and shunts.
Figure 4:
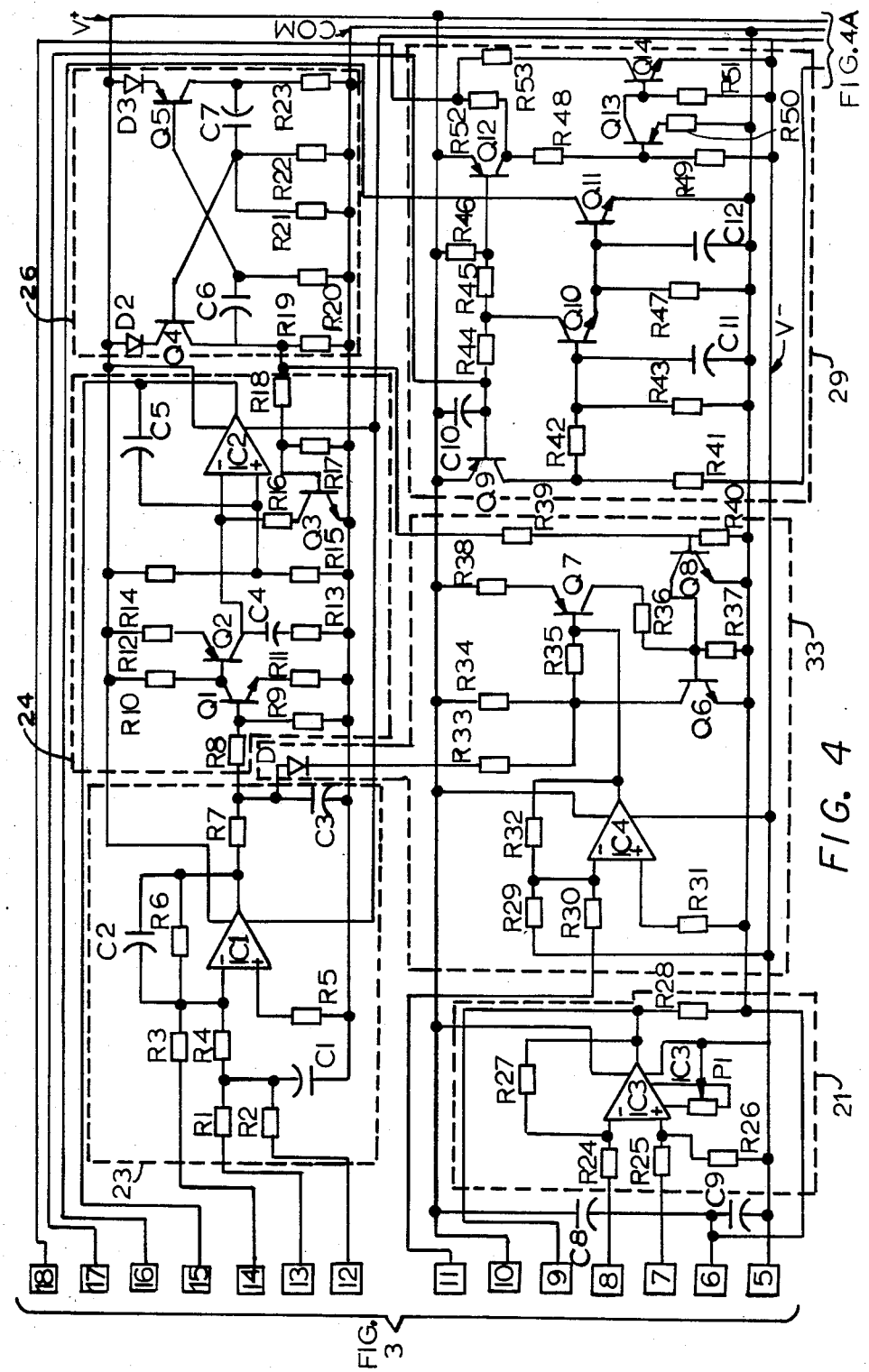
FIG. 4 is a schematic diagram of current feedback amplifier, regulator, duty cycle generator, pulse output timer, over current shunt and the current limiter and latch according to the invention.
Figure 4A:
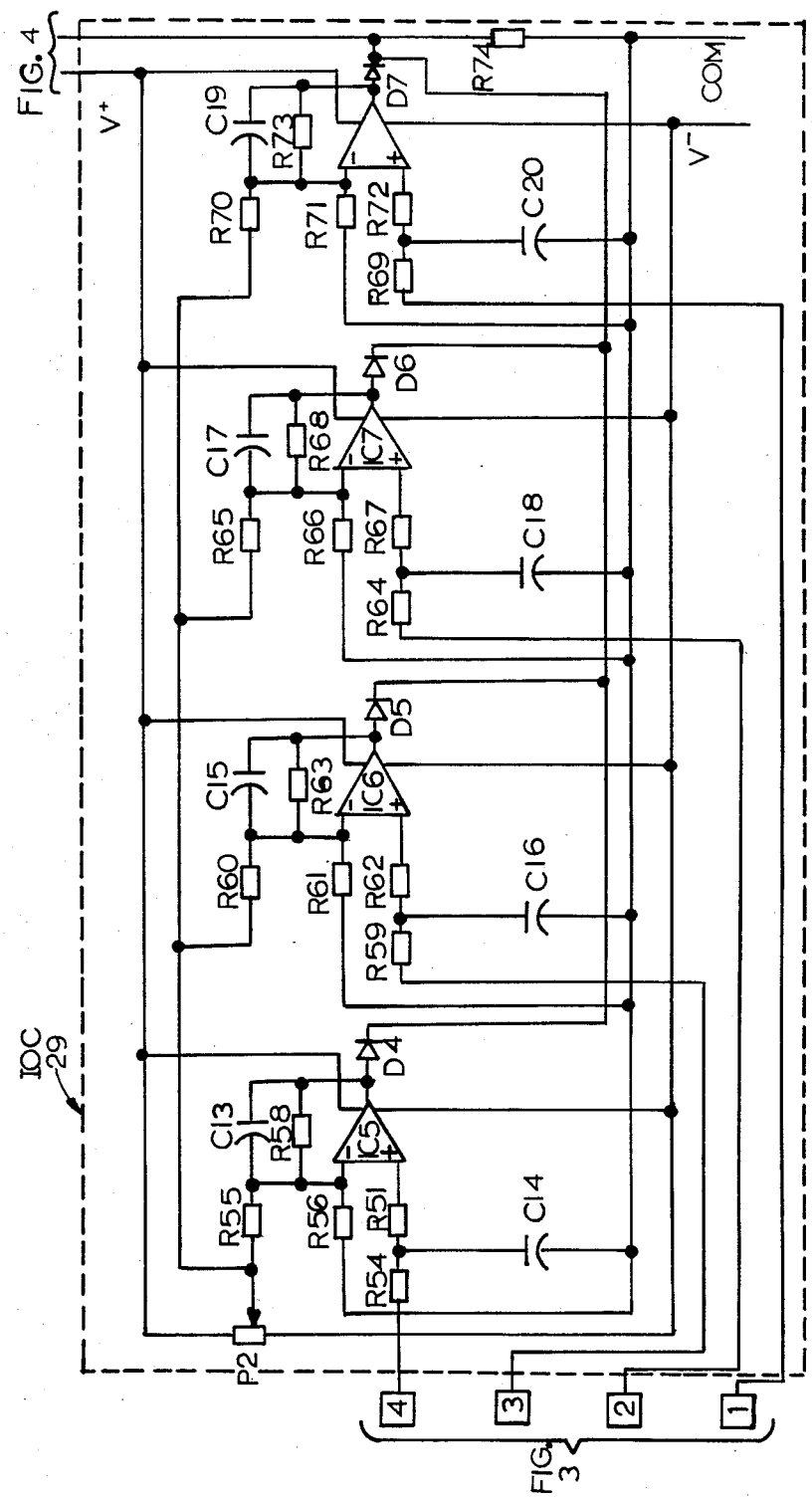
FIG. 4A is a schematic diagram of the open circuit detector circuit.
Figure 5:
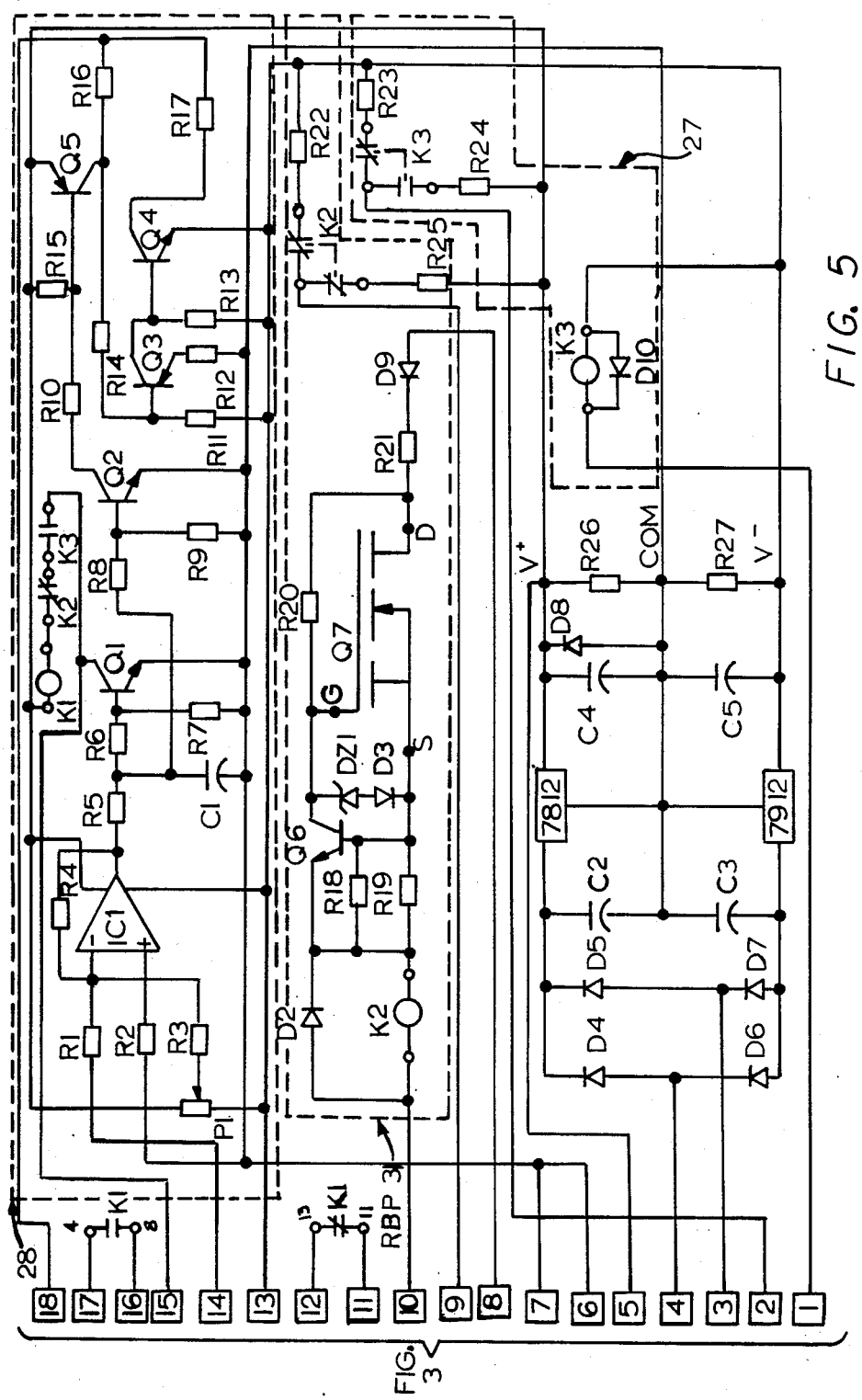
FIG. 5 is a schematic diagram of the open circuit detector (OCD), the reverse battery protector (RBP), and the thermal lockout switching element.
Figure 6:
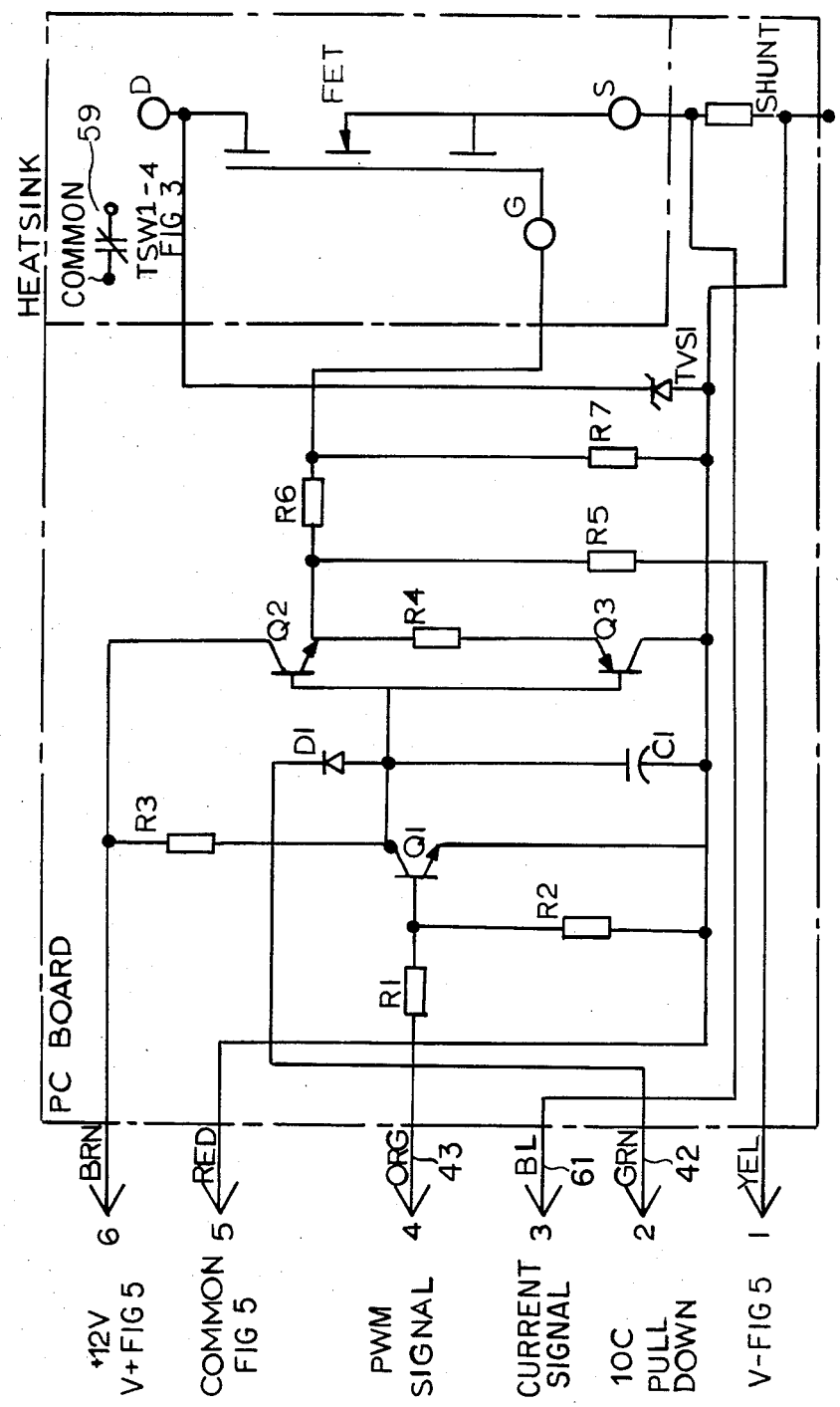
FIG. 6 is a schematic diagram of the gate driver and power module.
Figure 7:
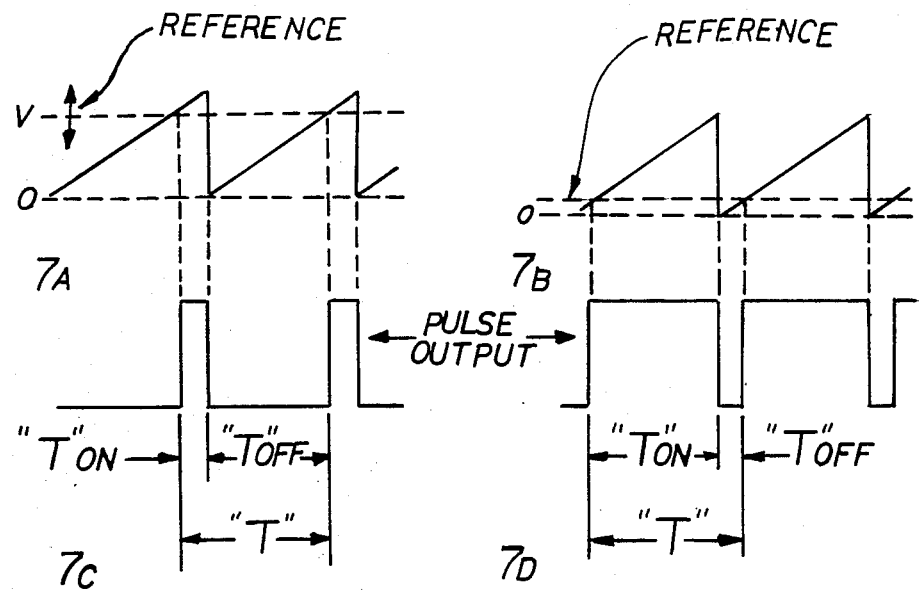
FIG. 7, comprising
Figure 8:
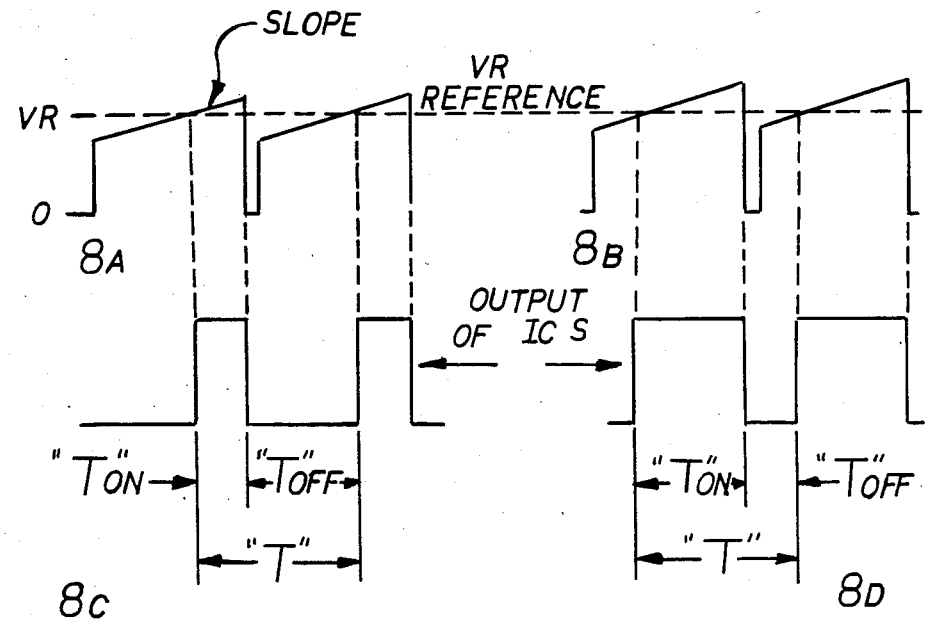
FIG. 8, comprising

FIGS. 1 through 6 of drawings describe the system and circuity. FIG. 2 shows the 3 phase AC to DC converter as the source of power for B+ and B− DC power. The AC to DC converter, shown in FIG. 2, would be sized according to the number of pulse width modulators (PWMs), indicated in FIG. 2, and their current capacity. The control power transformer (1CPT) is used to provide AC power for the internal PWM power supply. The control power supply three phase transformer 1T supplies power from lines L1, L2 and L3 through circuit breakers AC/CB. The transformer 1T output is rectified by RECT 1 containing rectifiers D1, D2, D3, D4, D5, D6 and fused by fuses 1FU, 2FU, 3FU, 4FU, 5FU and 6FU. In the example shown a number N of PWMs are shown made up of PWM-1, PWM 2, PWM 3, PWM 4, ... PWM-N, each connected to its respective load, LOAD 1, LOAD 2, LOAD 3, LOAD 4 ... LOAD N. The internal PWM power supply could also be a switch mode power supply (DC to DC converter) taking its source of power from the B+ and B−. This would make the PWM's four wire devices and would eliminate the need for the 115 VAC line drops. FIG. 1 is a block diagram of one PWM. The pulse width modulated DC to DC current controller is referred to here as a PWM for ease of writing. FIGS. 3 and 3A together show a wiring diagram of the PWM in more detail in circuit connections than FIG. 1. FIGS. 4, 5, and 6 show the detailed control electronics that are each supported on a printed circuit board.

The block diagram FIG. 1 will be used as the main focal point with references made for details to FIGS. 3, 3A, 4, 4A, 5 and 6. These drawings describe a four FET PWM, but is not limited to four FETS.

The load 30 is connected in line with the switching devices and does not depend on a transformer to transform the energy to the load. The advantage of not using a transformer between the power supply and the load is that there is no magnetic time constant to be considered. A properly designed transformer placed in the circuit where the batteries are located requires about 52 percent of a period "T" to transform the energy stored in the primary to the secondary or load side. This is called resetting the magnetics after a 48 percent maximum "on" time, of period "T". For this application a load of twelve batteries series connected would require an output voltage of at least 228 VDC or 12 times the maximum terminal formation voltage of 19 v. An output of 228 v with a duty cycle maximum of 48 percent would require a B+ voltage at 75 of 228 v/0.48=475 vdc and considering the efficiency factor the B+ voltage would be 545 vdc. To get the best energy transfer the free wheeling diode 1D, shown in FIG. 3A, would be removed. Removal of the free wheeling diode 1D, shown in FIG. 3A, would allow the B+ 75 voltage using a 545 vdc B+ to rise at points a and b on FIG. 3A or the drain of the power FET to better than 1000 vdc during the off period. (Note: presently there is only a 500 v, 15 amphere device available). The point to be made is that using the configuration shown in FIG. 1 a 250 vdc B+ voltage can easily form 12 batteries connected in series and more efficiently because there are no transformer losses, there is no magnetic time constant that limits the duty cycle. Therefore the duty cycle will range from 0 to 92 percent and the voltage across FETS 1Q to 4Q, during the off time of the period "T", will not exceed 60 percent of their breakdown rating.

The pulse width modulator (PWM) is a current controller therefore it is a closed loop system. The current signal is picked up from shunts 20 (SH 1, SH 2, SH 3 and SH 4) and changed to a voltage signal (current feedback block 21). This signal is scaled to the proper magnitude by amplifier IC3 and its related componets that forms a differential amplifier as shown in FIG. 4. The output of amplifier IC3 represents an error signal. The signal is received by P2 shown in FIG. 3 or the current feedback gain control block 22 in FIG. 1 and then received by amplifier IC1 and its related components shown in FIG. 4. Amplifier IC1 is termed the regulator block 23 (FIG. 1) and is a summing amplifier. Amplifier IC1 receives a reference signal from P3 shown in FIG. 3 that is opposite in polarity from the positive polarity error signal from amplifier IC3. Amplifier IC1's function is to sum the two signals and adjust its output to maintain a constant load current. The negative reference signal from P3 shown in FIG. 3 to amplifier IC1 will force its output to go positive toward V+. The positive error signal from amplifier IC3 will force amplifier IC1's output to go towards common. Amplifier IC1's output under normal operating conditions will be between common and V+, because the absence of a negative reference signal means there is no load current or shunt signal and no error signal. Therefore, the reference signal sets the load current and the error signal maintains the load current constant.

Following the signal flow from the regulator block 23 in FIG. 1, to the next functional block of FIG. 1, that is, the PWM duty cycle generator 24 (FIG. 1). The common approach to build a duty cycle generator is to form a saw tooth wave (triangular) and vary a reference over the slope of the saw tooth wave form.

To achieve a pulse output the points where the reference crosses the saw tooth wave are detected by a comparator. FIGS. 7A-7D shows two positions of the variable reference and how the "on" time (T on) increases as the reference voltage decrease. This method of generating a pulse with a pulse width modulator is typical for commercially available integrated PWM circuits (IC's) such as the TL494. These IC's are linear devices and do not perform well in a constant current feedback mode of operation that has non-linear load and circuit parameters.

GENERAL STATEMENT OF THE INVENTION

Considering the large and non-linear changes that can take place, a new approach had to be conceived that is cost effective and simple. The circuit that fits into the PWM duty cycle generator block 24 shown in FIG. 1 is detailed by Q1, Q2, Q3, and IC2 shown in FIG. 4 and their related components. This circuit has a fixed reference and the saw tooth varies in amplitude, but the saw tooth is actually trapezoidal with an adjustable slope. The slope is the important factor that makes the circuit respond to the large changes in load and circit impedences. FIGS. 8A-8D shows the wave form that is developed by the circuit in block 24 and has the variable slope adjustment capability.

VR is the reference voltage that is constant and set by the voltage divider resistors R14 and R15 and is one input to the non inverting input IC2. NPN transistor Q1, R8, R9, R10 and R11 form a linear amplifier with fast response from a signal input from IC1. PNP transistor Q2, R12, C4 and R13 form a controlled charge rate circuit to form the slope and sides of the trapezoid controlled by the input of Q1. If R13=0 OHMS the wave form would be saw tooth or triangular. Increasing the OHMIC value of R13 flattens the slope for a faster response. The combination of a fast Q1 amplifier to an IC1 input and the correct slope fixed by R13 makes the PWM regulate better than +/−2% on load current. IC2 (FIG. 4) is the voltage comparator that compares the reference VR to the crossing points on trapezoidal wave form as shown in FIGS. 8A-8D. IC2 finds the crossing points and outputs the square wave. NPN transistor Q3 is a reset switch controlled by signal pulses from the oscillator 26. The frequency of the oscillator 26 determines the switch rate period "T" and the input from IC1 determines the voltage height of the trapezoidal wave form of time on and time off of period "T". C5 is a positive feed back capacitor of several hundred picofarads that increases the slew rate of the operational amplifier IC2 that squares the output wave form.

The gate driver block (FIG. 6) is the next signal entry point. This is the line going from the PWM duty cycle generator block 24 to the current switching element block 25 in FIG. 1. NPN transistor Q1, R1, R2 and R3 are used as a high speed switch for wave shaping, an inverter and pre driver shown in FIG. 6. Capacitor C1, NPN transistor Q2, PNP transistor Q3 and resistor R4 form the complimentary pair gate driver for one power MOS FET PWM module shown in FIG. 6. Capacitor C1 slows down the turn on speed of the FET gate to allow the free wheeling diode 1D in FIG. 3A, time to start and support voltage in the reverse direction as the FET turns on. Q2 NPN transistor is fast switching and provides the gate drive voltage and initial current to charge the junction capacitance of the power FETs. PNP transistor Q3 turns on at the end of the on period ("T" on) drawing off the gate charge of the FET and pulling the gate to common. This allows for a positive FET turn off. Resistor R4 in conjunction with resistor R6 (R6 is a current limiting drive resistor) control the turn off speed of the FET because these resistors form an RC time constant, C being the gate capacitance. Therefore, by sizing R4 the turn off speed is controlled. R7 is used mainly for static charge protection when the module is disconnected from the system. R5 is connected to −12 v and will pull the FET gate to one diode drop below common due to the Vbe of Q2. This will assure the FET will remain turned off even if there is noise on the common line. TVS1 is a voltage surge suppressor that begins to conduct at about 380 v or about 75 percent of the FET drain to source voltage breakdown. D1 is controlled by the IOC circuit and is a means of turning off the gate driver for FET shutdown. The gate driver shown in FIG. 6 is a PC board mounted on each heatsink with the power MOS FET. This arrangement insures the shortest undistorted signal path to the gate of the FET and also each driver forms a buffer to the common control signal so that there will be no chance of parasitic oscillations occurring when the FET modules are paralleled. Capacitor 2C in FIG. 3A is important. Capacitor 2C acts like a snubber or shock absorber and it has two main functions. Without capacitor 2C, the controller would be destroyed. Since capacitor 2C is connected to the dc source voltage of the PWM current controller, to alternate oscillations when the switch means 25 bcomes conductive and nonconductive and to clamp the voltage excursion at the connection point of the switch means to the load when the switch means becomes non-conductive.

The current limit circuit 33 monitors the current by receiving the signal that is processed by the current feedback differential amplifier 21. When the load current of an individual pulse is too large, the circuit will activate and latch turning the signal off to the PWM duty cycle generator. This in turn turns the signal off to the gate driver circuit 023 shutting off the power FETS. The latch 33 will be reset by the oscillator 26 before the next period. The signal flow can be seen on the block diagram of FIG. 1.

The current limit circuit 33 can also be used to reshape the load current. The output of an AC to DC converter that supplies B+ VDC to the PWM's in FIG. 2 has an output ripple of 360 hertz. Viewing the PWM's current pulses at the shunt of the FET, the modules shown in FIG. 6, 360 hertz ripple becomes obvious as the load current is increased. The peak current pulses that are enveloped in the 360 hertz load current wave form can exceed 8 times the valley current pulses. The current limit circuit will limit the peak currents and since the PWM is a current controlled device a state of equilibrium must be maintained at the regulator. If the current limit potentiometer P1 shown in FIG. 3 is adjusted after the reference potentiometer P3 to the regulator is set for a certain output current and this metered current is not effected or changed by adjusting the current limit then the current pulses in another part of the wave form must change to satisfy the regulator. If the regulator is not satisfied then the PWM is in full current limit and the load current will decrease as the current limit is adjusted by potentiometer P1 (Wiring diagram FIG. 3 and Block diagram FIG. 1). Therefore, if potentiometer P1 is adjusted not to change the load current set by the reference potentiometer P3 to the regulator but able to limit the peak current pulses, the valley current pulses will increase in current magnitude. This function of the current limit acts like an inductive/capacitive filter on the B+ without incurring large expenditures for these components. Also if the peak currents are limited, the power FET's will run cooler at the same output current.

Details of the current limit circuit are shown in FIG. 4. IC4, Q6 and Q7 and their related components configure the current limit and latch. Q8 NPN transistor is the reset transistor for the latch that receives its reset signal from the oscillator 26. Therefore, the current limit circuit 33 is reset at the end of each T "on" period.

PROTECTION CIRCUITS

Referring to block diagram, FIG. 1, there are four protection circuits (1) the instantaneous over current trip (IOC) 29, (2) open circuit detector (OCD) 28, (3) switching element thermal lock-out (over temp) 27, (4) reverse battery monitor 31.

1. The instantaneous over current (IOC) 29 trip monitors the shunt or load current and will activate if the current pulse exceeds a preset value. Once the circuit is activated it will latch, turning the signal to the gate driver off, in other words it inhibits the gate drive signal through D1, FIG. 6, and prevents current conduction of the power FETS until manually reset. There are four IOC stages for this particular application. The stages are centered around the operational amplifiers IC5, IC6, IC7 and IC8, and the circuity for all stasges are configured the same. Stage IC5 will be described, see FIG. 4A. IC5 is the comparator that monitors the shunt signal. The shunt signal is low pass filtered enough by R54 and C14 not to cause distortion but to remove any high frequency noise. Potentiometer P2 forms an adjustable voltage divider to provide the reference signal. IC5 compares the two signals and when the shunt signal becomes slightly greater than the reference IC5 output will become positive and activate its latch circuit 29 shown in FIG. 4. The latch circuit shown in FIG. 4 is composed of PNP transistor Q9, NPN transistor Q10 and a pull down transistor Q11 and their related resistors. Transistors Q9, Q10 and Q11 are in the off state when the latch is not activated. A positive signal form IC5 will activate Q10. With Q10 on, Q9 base through R44 is drawn lower in potential than the emitter and Q9 turns on. The circuit is latched even after the positive signal from IC5 is removed. When Q10 turns on, Q11 turns on and pulls the base of Q2 on FIG. 6 through diode D1 on FIG. 6 to within VCE (SAT)+VD (Diode) of ground. Therefore, Q2 on FIG. 6 will remain off until Q11 is turned off. The latch and Q11 can be turned off by taking the base of Q9 to +12 v by pressing the IOC reset PB 1 shown in FIG. 3.

In FIG. 4, the remaining circuity after transistor Q11 is the light or bi-colored LED driver. When the latch 33 is not activated by any one of the IOC stages PNP Q13 is on. That is directly coupled to the base of NPN Q14 driving Q14 on. When Q14 is on the green LED in the single IOC 101 bi-colored light is on.

If the latch is activated by any one of the IOC stages, PNP Q12 will turn on applying voltage to the voltage divider R48 and R49 so that the base voltage of Q13 is higher than the emitter voltage turning Q13 and also Q14 off. The opposite polarity voltage is applied to the IOC 101 bi-colored LED and it turns red indicating an IOC fault has occurred. The bi-colored LEDs are two leaded devices and are bipolar.

The open circuit detector (OCD) 102 can be observed on FIG. 1 receiving its signal from the current feedback shunt amplifier. It also receives a reference signal from a voltage divider Potentiometer P1 shown in FIG. 5. IC1 shown in FIG. 5 compares these two signals and when the input signal from the current feedback amplifier increases beyond the reference voltage IC1 will go from V(set) by P1 to the threshold voltage of Q1 and turn on NPN transistor Q1, NPN transistor Q2 and PNP transistor Q5 and turn the bi-colored OCD LED from red to green by reversing the current through the bi-colored LED.

Observing the OCD block shown in FIG. 1, there is a start input, RBP input and OVER TEMP input. The start input is an external push button as shown in FIG. 3 but if the two conditions, RBP and OVER TEMP, are not correct the PWM will not start. In other words, the OCD will not activate.

The switching element thermal lockout (OVER TEMP) has a normally closed thermal switch on each MOS FET power module. The thermal switches are wired in series and connected to common on one side shown in FIG. 3 as TSW1-TSW4 and connected to a relay K3 as shown in FIG. 5 on the other side. K3 relay is energized when an over temp condition is not present. If one thermal switch opens, K3 de-energizes. The K3 contact opens in the collector circuit of Q1 shown in FIG. 5 in the OCD circuit 28. The PWM unit will shut down and can not be started by the OCD push putton until the thermal switch closes. When the thermal switch closes, K3 is energized, current is reversed through the bi-colored LED OVER TEMP light, and the light turns green.

The reverse battery protection circuit (RBP) is connected across the battery output leads 31 (FIG. 1). It will activate if a reverse voltage is above 20 volts in the reverse direction. The details of the RBP circuit are shown in FIG. 5. The object of the circuit is to apply a constant current to a PC board mounted relay for a reverse voltage that will range from 20 to about 160 volts. The reason, of course, is to try to determine out of a group of 12 batteries that have been partially to fully formed if the whole group is backwards or if part of the group is backwards in the series group before power is applied to the group.

As stated, the RBP circuit will apply to the relay K2 (FIG. 5) a constant current to the relay coil. The required current times the DC coil resistance will of course exceed the pull-in voltage of K2 relay which is 9 to 12 volts. Therefore Q7 is an N channel 3 amp 350 v power MOS FET that requires low gate drive current. R20 provides the gate drive and is connected from drain to gate. Q6 is a small signal NPN transistor that controls the amount of voltage on the gate of Q7 by sensing the current flow through Q7 source resistors R18 and R19. The voltage across R18 and R19 will not exceed the base to emitter voltage (Vbe) of Q6. Therefore, as the reverse voltage forementioned increases toward 160 volts and the voltage across R18 and R19 is held constant in turn providing a constant current to K2, then the excess voltage is dropped across Q7, or in other words, the RBP circuit is a constant current source for its load, that is K2. Resistor R21 is a current limiting resistor to protect the circuit until it stabilizes when a reverse voltage is applied. Diode D9 is for voltage blocking and D2 across the coil K2 is a clamp diode. Zener Diode Z1 and Diode D3 protect the gate of Q7 from voltage transients.

Relay K2 shown in FIG. 5 is a double throw double pole (DPDT) relay. One set of contacts controls the red/green bi-colored LED RBP light. When the circuit is not energized by a reverse voltage condition the LED is green. When the circuit is energized the LED will be red.

The second set of contacts provides an input to the OCD (FIG. 1) and these contacts (K2) are in the collector circuit of Q1 shown in FIG. 5.

Summarizing how the RBP, overtemp, start push button and OCD circuits work together; if all the LED lights are green (FIG. 1) except the OCD light, the system is ready to start. The start OCD (FIG. 3) push button is pressed and this will energize K1 by passing Q1 (FIG. 5). K1 is a double pole, double throw (DPDT) relay. One set of contacts that are normally closed (N.C.) will release the reference from common to IC1 (FIG. 4). The reference is provided by Potentiometer P3 (FIG. 3) to terminal 13 (FIG. 4) to R1. K1 N.C. contact pin 11 goes to terminal 11 and to common (FIG. 5 and FIG. 3). K1 N.C. contact pin 13 goes to terminal 12 (FIG. 5) and then to terminal 12 (FIG. 3). When K1 N.C. contact opens the reference voltage at R1 (FIG. 4) begins to charge capacitor C1 and a voltage will begin to appear across R4 which will shift the output of IC1. This scheme of a reference release in combination with the forementioned resistors and capacitor shown in FIG. 4 is called a soft start. It also protects against the operator leaving the reference Potentiometer P3 turned up and starting the unit into perhaps a fault.

The other set of K1 contacts, pins 4 and 8 (FIG. 5) goes to terminals 16 and 17 shown in FIG. 3 and in turn energizes the pilot relay CR1. CR1 contacts 4 and 6 will energize the power contactor (CON). CON is called circuit connector in FIG. 1. It would be noted that the power circuit is open in three places for personnel safety and to isolate the batteries from the PWM if by chance they are reverse connected which the RBP circuit will detect. The other set of CR1 contacts, pins 1 and 5, disconnect the RBP circuit for the normal starting and running condition. P The unit is energized and current is flowing through the batteries. When the reference Potentiometer P3 shown in FIG. 3 is turned up and the current exceeds the OCD current reference setting (about 1.5 to 2 amps) the OCD LED will turn from red to green and the OCD push button can be released meaning the OCD is latched into a load current.

The pulse width modulator will shut down if the current falls below the OCD reference setting, that could be an IOC fault, OVER TEMP fault or an open circuit. K3 contact will open and can only be started if the thermal circuit is closed energizing the K3 relay. The PWM will not start if the RBP circuit is energized. All the protective functions are visually indicated and the associated faults can be corrected.

Objects 1, 2 and 3 of this invention are closely tied together. The switching frequency cannot be too high because when the turn off time is adjusted the power loss in the FET's can increase. The switching frequency cannot be too low because the volume size and electrical size of the choke becomes large. The combination of these three objectives placed the switching frequency at 9.5K hertz. Calculations of circuit power loss or efficiency indicated the system to be better than 95 percent. The operating frequency, the choke and load impedence in combination form a vector system with a resultant vector and vector angle. The cosine of the angle of the resultant vector angle determines the power factor. When the cosine of the angle of the resultant vector is zero, unity power factor is achieved and is termed 100 percent power factor. The proper switch rate or operating frequency will appear to the source power system in FIG. 2 as an almost pure D.C. current draw that will also influence the power factor. The main factors that have achieved a power factor of almost 100 percent and high efficiency for the PWM, with a difficult load, are selecting the proper choke and operating frequency. Therefore, the choke serves two purposes; it limits the di/dt and is a load impedance matching element that aids to improve the power factor. A battery in general is capacitive in nature and the choke coil cooperates with the capacitance of the battery to result in a power factor of substantial unity.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A controller for forming hydroset batteries having no internal voltage comprising:
   a pulse width modulated duty cycle generator (24),
   a source of direct current (75–76),
   connecting means for connecting said source of direct current to a group of hydroset batteries (30),
   said group (30) comprising batteries connected in series with one another forming a load,
   said connecting means comprising:
   a circuit connector (37),
   a rate of rise limiter (38),
   a battery circuit connector (36),
   current switching means (25),
   shunt means (20),
   said pulse width modulated duty cycle generator being responsive to current flow through said current switching means (25),
   said circuit connector (37), said rate of rise limiter (38), said battery circuit connector (36), said current switching means (25) and said shunt means (20) being connected in series with each other and adapted to be connected in series with said battery group (30) to be electroformed into said batteries whereby said current through said battery load is substantially constant,
   said pulse width modulated duty cycle generator (24) being connected to said current switching means (25) and controlling current flow through said current switching means (25).

2. The controller recited in claim 1 wherein said current switching means comprises a plurality of MOS FETS each having a gate means,
   and gate driver means connected to said duty cycle generator means and to said gate means.

3. The controller recited in claim 2 wherein said controller comprises an open circuit detector (28) and means connecting said open circuit detector to said current switching means (25).

4. The controller recited in claim 3 wherein an instantaneous over current shut down circuit (29) is connected to said switching means (25).

5. The controller recited in claim 1 wherein a reverse battery protector circuit (31) is connected to said switching means.

6. The controller recited in claim 5 wherein a current feedback gain control (32) is connected to said shunt means (20).

7. The controller recited in claim 6 wherein said current feedback gain control (32) is connected to said shunt (20) through a shunt amplifier (21).

8. The controller recited in claim 7 wherein said controller includes a pulse output timer (26) connected to said duty cycle generator (24).

9. The controller recited in claim 8 wherein a current limiter latch (33) is connected to said duty cycle generator (24).

10. The circuit recited in claim 9 wherein a regulator (23) is connected to said pulse width duty cycle generator (24).

11. The controller recited in claim 10 wherein a voltage reference means (34) is connected to said regulator (23).

12. The controller recited in claim 11 wherein an open circuit detector (28) is connected to said battery circuit connector (37) through a switch (35).

13. The controller recited in claim 10 wherein switch (35) connects said circuit connector (37) through connecting means to said regulator (23) and to said open circuit detector 28.

14. The controller recited in claim 13 wherein said current feedback gain control (32) is connected to said regulator (23).

15. The controller recited in claim 14 wherein said switching means comprises MOS FETS.

16. The controller recited in claim 1 wherein said controller is a closed loop system,
wherein means is provided whereby a current signal picked up from said shunt means is changed to a voltage signal
and connected to said current switching means (25).

17. The controller recited in claim 16 wherein said amplifying means is connected to said switching means by way of said shunt means.

18. The circuit recited in claim 2 wherein said pulse width modulator duty cycle generator 24 comprises pulse width modulator means connected to said MOS FETS.

19. The circuit recited in claim 18 wherein said pulse width modulator comprises means connected to said switching means to produce a current in the form of a generally trapezoidal wave shape.

20. The circuit recited in claim 19 wherein said hydroset batteries have an impedance and said wave shape has a sloped top that conforms generally to said impedance.

21. The circuit recited in claim 19 wherein said pulse width modulator comprises an oscillator controlling the frequency of said wave shape.

22. The circuit recited in claim 21 wherein said MOS FETS are connected in parallel with each other,
one of said gate driver means is connected to each said gate means.

23. The circuit recited in claim 21 wherein a regulator is connected to said pulse width modulator.

24. The circuit recited in claim 2 wherein each said gate means has a resistor connected to said gate means creating a R.C. time constant with the capacitance of the time constant being the capacitance of the gate whereby both turn off and turn on switching time of the MOS FET is increased.

25. The circuit recited in claim 24 wherein a capacitor 2C is connected to said shunt means and to said rate of rise limiter,
said capacitor being adapted to act as a snubber to attenuate oscillations when said current switching means becomes conductive and non-conductive and to clamp the voltage excursion at the connection point of said current switching means to said load when said switch means becomes non-conductive.

26. A circuit for use in hydroset battery electroformation comprising:
a source of direct current (75,76) having a first side (75) and a second side (76),
a rate of current rise limiter (38),
a circuit connector (37), hydroset battery electrodes to be formed, current switching means (25),
said first side (75) of said source of direct current being connected to said circuit connector (37),
said second side (76) of said source of said direct current having means connecting it to said current switching means 25,
said rate of rise limiter (38), said battery circuit connector (36) and said current switching means 25 being connected in series with one another and with said first side (75) and said second side (76) of said source of said direct current,
a plurality of pulse width modulators (24),
a plurality of groups of battery electrodes (30) to be formed, said switching means (25) comprising a plurality of curent switching elements,
each said current switching element having a gate and being connected to a said group of battery electrodes,
said pulse width modulators (24) being connected to a said source of direct current and connected in parallel with each other,
said pulse width modulators (24) being connected to control means.

27. The circuit recited in claim 20 wherein said source of direct current comprises a three phase transformer,
said three phase transformer having three primary windings and three secondary windings,
said primary windings being connected together in a Y configuration,
means to connect said primary windings to a three phase power supply,
said secondary windings being connected together in delta configuration,
full wave rectifier means connecting said secondary windings to said pulse width modulators whereby a DC voltage is applied to said pulse width modulator and said battery electrodes.

28. The circuit recited in claim 27 wherein a single phase transformer primary winding is connected to one of said primary windings,
said secondary winding of said single phase transformer is connected to said pulse width modulator.

29. The circuit recited in claim 28 wherein current feedback shunt amplifier means is provided,
said current feedback shunt amplifier means is connected in series with said DC power supply and said battery.

30. The circuit recited in claim 26 wherein said current switching means comprises MOS FETS.

31. The circuit recited in claim 26 wherein said circuit comprises an open circuit detector (28) connected to said switch means (25).

32. The circuit recited in claim 26 wherein an instantaneous over current shut down circuit (29) is connected to said switching means (25).

33. A circuit for forming hydroset batteries having no internal voltage comprising:
a source of direct current power (75, 76) having a first side and a second side,
a load comprising a group of hydroset batteries (30) to be formed having variable impedance,
said load having a first side and a second side,
said first side (75) of said direct current power source being connected to said first side of said load (30) through a rate of current rise limiter means having variable impedance,
current switching elements comprising MOS FET means connected in parallel with each other,
each said MOS FET means having a gate means and being connected to a second side of said load (30),
a shunt means (20) connecting said second side of said source of power to said switching means (25) to said second side of said load,
a closed loop system including pulse width modulator means (24) having a plurality of gate drive means connected thereto and connected to each said gate on said MOS FET units,
said closed loop system including said pulse width modulator, a regulator, a current feedback gain control and a current feedback shunt amplifier connected in series to said shunt means and said current switching elements, said current switching elements connected to said pulse width modulator means (24) for controlling the width of electrical pulses from said MOS FET means.

34. The circuit recited in claim 33 wherein open circuit detector means (28) is connected to said battery circuit connector (36) for interrupting the current flow from said power source in case of an open circuit.

35. The circuit recited in claim 34 wherein said first side of said power source is connected to said current switching members (25) through a rate of rise limiter (38).

36. The circuit recited in claim 35 wherein said open circuit detector is connected to said current switching means (25) through a reverse battery protection lockout means (31).

37. The circuit recited in claim 36 wherein said shunt means is connected to an instantaneous overcurrent shutdown means (29) by current to said load whereby said current is substantially instantaneously shut off in case of an overcurrent of a predetermined amount.

* * * * *